Jan. 13, 1959    H. O. REDFEARN    2,868,257
MEANS FOR RECAPPING TIRES
Filed June 20, 1955    2 Sheets-Sheet 1

Howard O. Redfearn
INVENTOR.

Jan. 13, 1959     H. O. REDFEARN     2,868,257
MEANS FOR RECAPPING TIRES
Filed June 20, 1955     2 Sheets-Sheet 2

Howard O. Redfearn
INVENTOR.

United States Patent Office 2,868,257
Patented Jan. 13, 1959

2,868,257

MEANS FOR RECAPPING TIRES

Howard O. Redfearn, Keauhou, Kona, Territory of Hawaii

Application June 20, 1955, Serial No. 516,363

6 Claims. (Cl. 152—187)

This invention comprises novel and useful improvements in a method and means for recapping tires and more specifically relates to a tire construction having associated mesh reinforcing and stiffening means for the tread portion of the tire.

The primary purpose of this invention is to provide a tire tread construction which shall be greatly strengthened and improved in its wearing characteristics by the incorporation of a network or mesh of strands in close cooperation with the tread portion of the construction.

A further object of the invention is to provide a reinforcing network of strands which shall be equally adapted for use in a tire construction or in a recap construction for use with tires.

An additional object of this invention is to improve the construction of tires and retread units therefor, by incorporating a stiffening network or skeleton of tension members into the material of one or more plies of the tire, in an improved manner, to stiffen and reinforce the tread portion thereof.

A still further object of the invention is to provide a tire construction in accordance with the foregoing objects which shall be particularly adapted for use in a shoe for detachable engagement upon the tread portion of a tire as for example to provide a snow tire tread construction for heavy duty use thereon.

Still another important object of the invention is to provide a tire tread construction which may be readily applied to a tire for recapping and retreading the same.

Still another important object of the invention is to provide a recap tire tread construction in accordance with the preceding objects in which electric heating wires for vulcanizing the recap to the tread portion of a tire may be permanently embodied in the recap construction.

Yet another important object of the invention is to provide a tire tread construction in which the reinforcing members shall be particularly adapted for stiffening, reinforcing and strengthening the enlarged cleats of tires as for example the cleats employed in heavy duty tires such as snow or mud tires and in racing tires.

And a final important object of the invention is to provide an improved tire tread construction, equally adapted for use in recapping or retreading a tire or in providing a removable snow tread construction therefor, and which shall be of easily applied construction.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
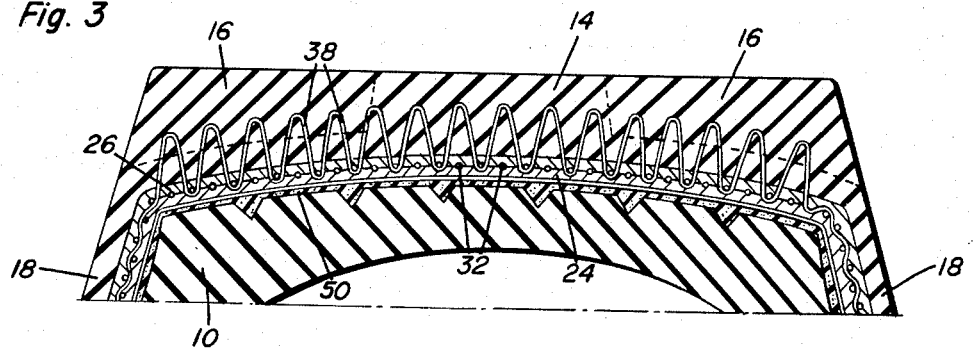
Figure 4:
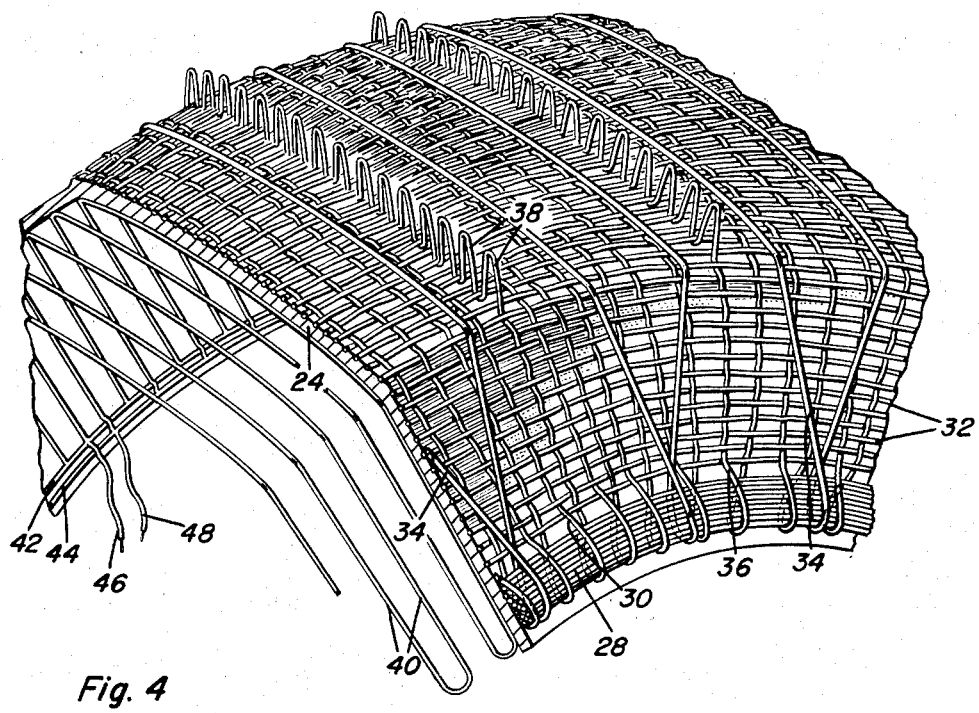

Figure 3 is a vertical transverse detail view of a portion of the tire showing the recap construction applied thereto, but taken upon a transverse plane through the cleats of the tire tread; and Figure 4 is a diagrammatic view in perspective showing the reinforcing network or mesh and the electric heating elements which are associated with the plies of a tire construction in accordance with this invention.

Designated generally by the numeral 10 is a tire having a recap tread construction indicated generally by the numeral 12 applied thereto in accordance with this invention. The tread construction of the recap assembly is greatly strengthened and reinforced by the incorporation therein during its manufacture or fabrication of a reinforcing and strengthening mesh or network of tension strands or elements. This skeletal reinforcing structure is shown most clearly in Figure 4. Briefly, it comprises a plurality of circumferentially extending wires or other tensile elements such as nylon or fiber glass cords or the like and which impart great tensile strength to the network or mesh, accompanied by a plurality of transversely extending tension members or elements which impart lateral strength and rigidity to the tire recap construction.

Figure 2:
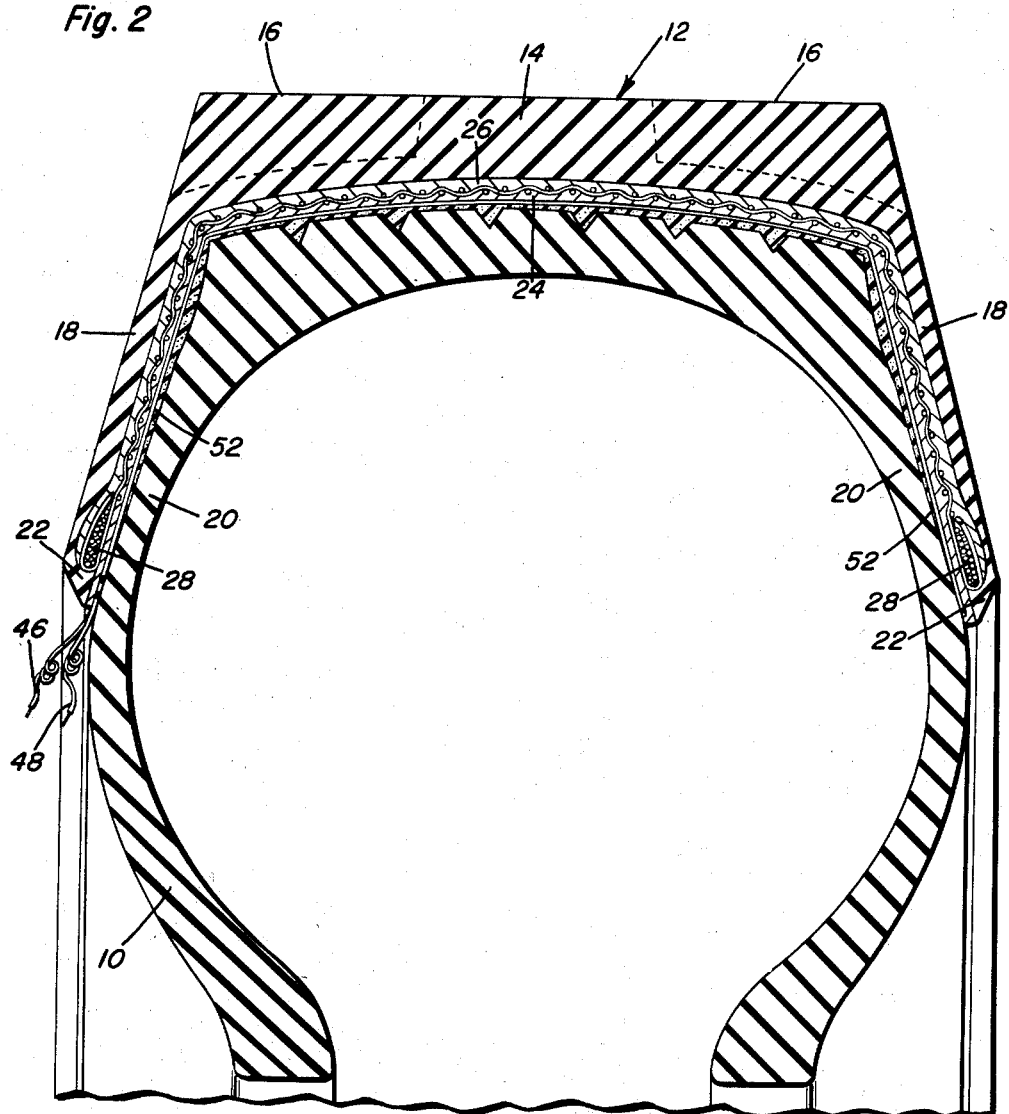
Figure 2 is an enlarged detail view taken substantially upon the plane indicated by the section line 2—2 of Figure 1 and showing in vertical radial section a tire together with the recap construction of this invention applied thereto.
Figure 1:
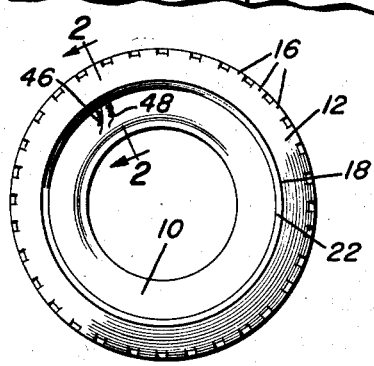
Figure 1 is a side elevational view of a tire showing a recap tread construction in accordance with this invention applied thereto.

As shown best in Figure 2, the recap assembly 12 consists of one or more longitudinally extending ribs 14 extending circumferentially about the recap assembly, and from which extend laterally or transversely projecting treads 16 in various designs or patterns. In addition to the tread portion consisting of the members 14 and 16, the recap assembly also includes side walls 18 which are adapted to snugly embrace the side walls 20 of the tire 10, the side walls 18 terminating in bead portions 22.

In its most comprehensive form, the recap assembly 12 consists of at least two fabric plies comprising an inner ply 24 and an outer ply 26. Between these plies or within one ply is incorporated the reinforcing mesh or network assembly to be hereinafter described, and the plies are bonded to each other and in addition are bonded to the side walls 18 and the tread construction 14 and 16.

In the recap tread assembly 14, there are provided in the beads 22 the customary wires 28 forming the strengthening elements of the beads of a tire and which impart rigidity and strength to the bead portion of the recap assembly. The transverse reinforcing elements of the mesh or network are secured to the bead wires 28 as shown in Figure 4. Thus, there is provided one or more courses of tensioning elements 30 which extend transversely across the width of the reinforcing mesh of the recap assembly and which have their opposite ends turned about and embracing the bead wires 28. These courses may be woven through or otherwise secured to the longitudinally extending tension members 32 of the reinforcing network. If desired the course 30 may consist of a single strand which is so interwoven back and forth across the skeletal reinforcing mesh of the recap unit, or a number of such strands may be employed. In addition, or if desired as a substitute therefor, there is provided a second course of transversely disposed tensioning elements 34 which are secured at the opposite sides of the tires about the beads 22 and then extend transversely back and forth across the longitudinal elements 32, but are not bonded or fixedly secured thereto.

Still further, certain of the transverse courses as at 36 are provided upon the tread portion of the recap unit with a plurality of upstanding loops 38. As shown best in Figure 3, these loops are adapted to be embedded in the cleats 16 and/or in the longitudinal rib or ribs 14 forming the tread portions of the recap assembly. The loops serve to reinforce and stiffen these tread portions and longitudinal ribs which in snow tires or racing tires are frequently of very large size and tend to readily be torn from the body portion of the tread part of the tire construction. It will, of course, be understood that in some instances selected ones of the above mentioned transversely extending courses of tension elements may be omitted, although it is possible to employ all of these previously described elements in a single construction, with advantage.

Conveniently, the course 30 containing the loops 38 may be formed by sewing material of these loops through the upper or outer ply 26.

Disposed on the inside of the inner fabric 24 are pairs of transversely disposed resistance heating elements 40. These elements are connected to circumferentially extending electric leads 42 and 44 which are provided with conductors 46 and 48 respectively, these last mentioned conductors, as shown in Figure 2, extending below the bead portion 22 where they may be attached to any suitable electric source. It will be observed that the pairs of transversely disposed heating elements 40 have their opposite ends connected to the conductors 42 and 44, at conveniently spaced intervals along the circumference of the recap unit. Disposed inwardly of the inner ply 24 and vulcanized thereto is a layer or sheet of vulcanizing material 50, the resistance elements 40 being disposed between the sheet 50 and the ply 24. Thus, when the recap unit is placed upon the properly prepared tread portion of a tire 10, the heating elements may be energized thereby causing a vulcanization of the inner ply 24 to the tread portion of the tire 10 through the vulcanizing material 50. After the unit has been vulcanized in place, and it will be observed that this sheet of vulcanizing material has side portions 52 which extend inside the portions 18 and down to the bead 22, in order that the recap unit 12 may be effectively bonded to the side walls and tread portion of the tire, the leads 46 may be cut and the tire with its recap thereon is ready for use. It will of course be apparent however that in some instances it will be preferred to omit the heating elements 40, 42, 44, 46 and 48, although it is intended that the recap unit may be provided with these elements in place to admit of vulcanizing the recap unit upon the tire 10.

It will be observed however that owing to the stiffening and reinforcing action of the skeletal network or mesh consisting of the circumferential and transverse tension elements, that the recap unit is of sufficient strength and rigidity to closely grip the side wall and tread portion of a tire and to stay in place thereon without the vulcanization above mentioned. In some instances it may therefore be preferred to employ cold cement for bonding these parts together, although actually, except in the case of tires for relatively fast moving vehicles, the frictional grip of the recap unit upon the tread portion of a tire will be sufficient to firmly retain the recap unit in place.

By placing the skeletal reinforcing network between the two plies 24 and 26, the circumferential and transverse tension elements will be best held in place, and will further provide a non-stretchable skeleton by which the recap tread portion is firmly secured in gripping engagement upon the tread and side portions of the tire.

As illustrated in the drawings, the skeletal reinforcing member has been applied to a recap or retread unit assembly adapted to be placed upon the tread and side portions of conventional tires for providing a new tread surface thereon. In some instances, however, it is to be understood that this construction may be employed in the actual construction of the tread portion of a tire as originally fabricated, in which case the plies 24 and 26 will constitute a portion of the plies of the tire while the tread members 14 and 16 will constitute a portion of the tread surface of the tire. In that event also the side walls 18 will be extended down to the full length of and will in fact become the side walls of the tire itself. In such usage, however, it is evident that the heating elements previously mentioned will be no longer necessary and will be omitted, since during the fabrication of the tire the customary vulcanizing processes will be employed.

It is considered that the essential feature of this invention is the provision of the skeletal mesh or network of strong tensile elements extending both circumferentially and transversely of the tread portion of a tire or a tire recap unit and which impart greatly improved strength and rigidity to this tread portion. In addition, the provision of the looped portions 38 in certain of the transverse elements for embedment in the tread element 16 or 14 of the tread surface of a tire or tire recap unit greatly strengthen and improve the durability of such tread elements.

The skeletal mesh assembly enables a recap unit in the form of an overshoe to be readily applied to a conventional tire having a normal tread, and without damage to that tread for temporarily converting the tire into specialized uses such as in winter weather where the tread of exceptional size is desirable. When the occasion for the use of the extra heavy tread no longer exists, such overshoe may be readily removed and the normal tread of the tire will resume its interrupted functioning.

It will be noted that in its most complex form, the recap tread assembly 12 provides a means whereby a worn tire, after being appropriately buffed down to provide a proper surface for receiving the recap unit, may be quickly and easily recapped without the use of expensive equipment by merely applying the assembly 12 thereon and energizing the built-in heating system. Alternatively, cold adhesive may be applied where such bonding is deemed necessary. For most purposes, however, it will be found sufficient to merely apply the assembly 12 and inflate the tire 10, and the sponge rubber or soft rubber sheet 50 will establish a satisfactory gripping action with the tire.

For convenience of illustration, the skeletal mesh has been shown between the two plies 24, 26. As above pointed out, however, the mesh may have some or all of its tension members incorporated into the structure of a ply as a part of the strands thereof. When the ply is fabricated with the circumferential and/or the transverse tension elements incorporated into the strands of the ply as a part thereof, the desired reinforcing or stiffening effect of the tire or recap unit is realized and the fabrication of the article is considerably facilitated by the elimination of the network as a separate element to be inserted and secured to the plies.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tire recap and tread construction adapted to embrace the tread and side wall portion of a pneumatic tire and provide a retread therefor comprising; a body having a tread portion and side walls with beads and adapted to overlie and cover the tread and the side walls respectively of a tire, the side walls of said body being of sufficient size to cover the side walls of the tire to about the midportion thereof only, said body including at least two plies of fabric secured to the body beads, tread elements bonded to said body, a skeletal network of tension elements disposed in the tread and side wall portions of said body and disposed in contact with at least one of said plies, said network including transverse tension elements having their opposite ends anchored in said body beads, a layer of vulcanizable material forming a resilient, deformable liner for said body and underlying the innermost ply and adapted to contact the tread and side walls of a tire for securing said body thereto, at least some of said transverse tension elements including loops extending radially from the body and embedded and anchored in said body treads.

2. The combination of claim 1 wherein the loops in one transverse tension element are flat and lie in a common plane extending transversely through said body.

3. The combination of claim 2 including longitudinal tension elements in said body extending circumferentially thereof, said longitudinal tension elements overlying and retaining said transverse tension elements between said loops.

4. The combination of claim 1 including a system of electric resistance heating wires disposed between the innermost ply and said sheet of vulcanizable material.

5. The combination of claim 4 wherein heating wires extend transversely across said body from bead to bead thereto.

6. The combination of claim 1 wherein said transverse tension elements are disposed between a pair of plies and is stitched through the outermost ply.

References Cited in the file of this patent

UNITED STATES PATENTS

| | | |
|---|---|---|
| 665,146 | Swain | Jan. 1, 1901 |
| 908,475 | Midgley et al. | Jan. 5, 1909 |
| 1,216,654 | Burke | Feb. 20, 1917 |
| 1,393,196 | Breitweiser | Oct. 11, 1929 |
| 2,119,557 | Randel | June 7, 1938 |

FOREIGN PATENTS

| | | |
|---|---|---|
| 19,148 | Great Britain | of 1912 |